Patented May 3, 1949

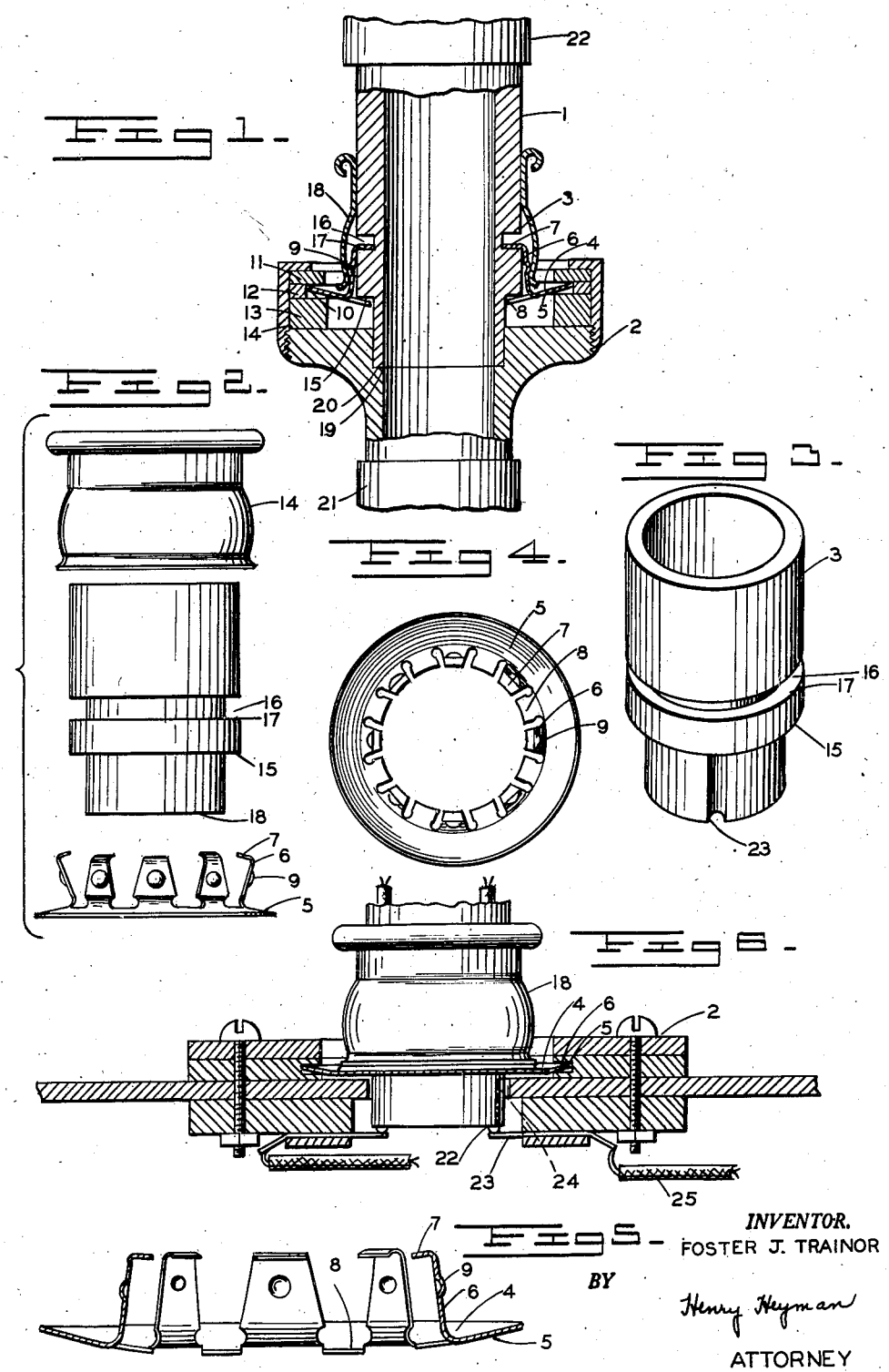

2,468,847

UNITED STATES PATENT OFFICE 2,468,847

SNAP ACTION COUPLING DEVICE

Foster J. Trainor, Holly Hill, Fla., assignor to Disto Corporation, Holly Hill, Fla.

Application June 17, 1947, Serial No. 755,034

11 Claims. (Cl. 285—174)

My invention relates to a detachable coupling for flexible conduits, electrical plugs and sockets, or the like, wherein it is desirable that the parts be joined by urging one part axially against the other and detached by pulling the parts, one from the other, and in addition, to provide a safety device to prevent the accidental separation of the parts.

The connector of this invention utilizes a snap action gripping device which is a modification of that shown in application Serial Number 748,291, filed by me on May 15, 1947.

There are many applications in which it is desirable to provide a coupling which is of the push-to-connect; pull to disconnect type.

It is an object of this invention to provide a novel gripping element for use in push-to-connect; pull to disconnect couplings.

Another object is to provide a gripping element which imparts a definite axial force to the coupling parts when connected.

Another object is to provide a gripping element of the snap action type in which the snap action is initiated by pressure against a part other than the gripping portions thereof.

Another object is to provide a novel electrical plug and socket having a snap action engage and disengage characteristic.

According to my invention, I provide a novel form of gripping element for the socket part of a plug and socket combination. My gripping element is preferably in the form of an open-center convex disc of resilient material having two conditions of stability which are convex configurations on either side of a plane passing through the outer periphery thereof. This disc has gripping fingers affixed intermediate the inner and outer boundaries thereof so that when the disc is convex in one direction the fingers are drawn inward and axially toward the disc, and when the disc is convex in the other direction the fingers open or spread apart. Since the disc is of resilient material it has the characteristic of resisting change in its convex form until dead center is reached, and from that point it snaps into the second convex form.

Other features and advantages of my invention will appear from the following detailed description of species thereof and from the drawing:

In the drawing—

Fig. 1 is a section through one form of coupler;

Fig. 2 is an exploded view of parts thereof;

Fig. 3 is a perspective view of the plug member;

Fig. 4 is a plan view of the snap action element;

Fig. 5 is a cross-sectional view of the snap action element in gripping condition; and Fig. 6 is a cross-section of my device applied to an electrical plug and socket.

Referring to the drawing, a coupler for hoses, electric cables and the like is shown in Fig. 1, and comprises generally a plug member 1 and a socket member 2. The socket houses the outer portion of the snap action gripping device indicated generally at 4 in a groove 10. Plug member 1 when urged toward the socket member 2 causes the fingers 6 and prongs 7 of the snap action device to spring inwardly in a manner which will presently become apparent. The prongs 7 cooperate with the lower wall of groove 16 in the plug to grip the same and urge the same axially toward the socket. A safety device in the form of a cylindrical locking tube 18 having an expanded section near the lower portion thereof is provided to be slipped over the finger portions of the snap action gripping device when the plug and socket are assembled to lock the same together and prevent the uncoupling of the same unless the said tube 18 is withdrawn from engagement with the said finger portions 6. Outwardly directed protrusions 9 are provided on the fingers to frictionally engage the expanded portion of the locking tube to prevent the accidental displacement of the same.

The snap action gripping element will now be described in detail. Referring to the drawing, particularly Figures 2, 4 and 5, I have shown a preferred form of the gripping element generally at 4, as being of circular shape and having a base 5 in the form of a dished annular ring of resilient material and having on the inner periphery thereof struck-up fingers 6, having a root portion integral with the portion of the ring from which struck, and extending in a direction generally normal to the surface of the portion from which struck. Each of the fingers has a prong 7 struck thereon extending approximately normal thereto and inwardly, that is to say, toward the axis of the ring. Between the fingers I provide inwardly extending portions 8 of the base portion for a purpose later to become apparent.

The base portion 5, which is the dished annular ring, has two conditions of stability which are convex alternately to opposed sides of a plane passing through the periphery of the ring. An equivalent statement is that if the ring is supported in the plane of its outer periphery one condition of stability is that wherein the inner periphery has a position displaced axially in one direction from said plane; and the second position of stability is that wherein the inner periphery is displaced axially on the opposite side of said plane. One way in which I obtain this effect is by permanently stretching the resilient metal on and adjacent the inner periphery of the ring so that the ring assumes a dished shape. I can however, make the base member from a strip of metal formed to the shape of a dished ring with ends butting or lapping, and connected together as by welding, brazing, soldering or the like.

I find a simple and economical way to fabricate my snap action gripping element is to first punch out of a flat sheet a flat open-center disc having an outer size and shape of the desired outer size and shape of the snap action gripping element. Then I scribe an outline of the desired finger and prong portions which are spaced apart, and in the intervening spaces, the inwardly extending portions 8. I then punch out the unwanted material, strike up the fingers adjacent the inner periphery of the base portion and strike inwardly directed prongs on the fingers. The inner periphery of the base is stretched by the punching operation to give the dished shape, though I find peening, pressing or rolling desirable in some cases to accentuate the convexity. It is noted that the protrusions 9 on the fingers may be formed in a separate step or simultaneously with the striking out of the unwanted metal by simply dimpling the material from the back or under side.

It will also be noted that the slits or cut-out portions between the fingers 6 and the inwardly struck base extensions 8 terminate in curves in order to relieve concentrated stresses to prevent the formation of fatigue cracks in the base portion 5, due to repeated flexing.

While I have described the snap action gripping device as generally circular, it is obvious that it may have any desirable shape to cooperate with the shape of any desirable plug and socket.

It is now apparent that when the dished ring is upwardly convex, the root of the fingers and the base inward extensions are above the outer periphery of the ring, that the fingers now incline outwardly and that the space circumscribed by the inturned prongs is increased by the outward inclination of the fingers.

If the pressure is exerted axially downwardly on the inward extensions 8 of the base 5, the same will resist the motion until a position of dead center is reached, at which point the dished ring 5 will snap into its downwardly convex position as shown in Figs. 1 and 5, and the fingers and therefore the prongs move axially downward a distance substantially equal to the axial motion of the inner periphery of the ring and the fingers and therefore the prongs circumscribe a decreased space by virtue of the inward inclination of the fingers. There is thus obtained two desirable effects which are, axial motion toward the snap ring, and inward gripping of the prongs.

Fig. 1 shows one application of the snap action gripping device to a coupler for flexible hoses, electrical conduits and the like. In the socket part shown generally at 2, I provide an internal groove 10 in which I seat the outer periphery of the snap action device 4. The walls of the socket converge to the desired cross section and I find it desirable to provide an internal shoulder 19 upon which I seat the end 20 of plug member 1.

The plug member 1 has an end section of a size and shape to telescope into the socket. The extension section terminates at an outwardly extending shoulder 15. This shoulder forms the lower surface of an outwardly extending peripheral portion the upper surface of which forms the lower wall or shoulder 17 of groove 16. The length of the outwardly extending peripheral portion is slightly less than the length of the finger portions of the snap action gripping device. The outside dimension of the outwardly extending peripheral portion is such as to freely pass into the space circumscribed by the prongs when the snap action gripping device is in upwardly convex or open condition such as shown in Fig. 2. The lower shoulder 15 of this portion passes freely into the socket until it abuts the inwardly extending disc base portions 8. Further urging of the plug toward the socket causes the snap ring to flatten until the condition of dead center is reached. At that point the fingers have moved inwardly and the prongs engage the lower wall or shoulder 17 of groove 16. Any further movement permits the snap action device to snap the plug downward into the socket, and to urge the fingers and therefore the prongs forcibly inward.

To prevent the accidental separation of the plug and socket as by a jerk or pull on either member I provide the peripheral locking member or shell 18, which is free to telescope on the outside wall 3 of the plug member 1. The locking member has an enlarged portion to frictionally cooperate with the outwardly extending protrusions on the fingers to prevent its accidental displacement from locking position. It will be seen by reference to Fig. 1, that the plug and socket cannot be separated until locking member 18 is slidably disengaged from fingers 6 of the snap action element 4.

A gasket may be provided between the end 20 of the plug and the shoulder 19 of the socket in any case where a leak-tight joint is required.

It is to be noted that in the instance of Fig. 1, the installation of the snap action device in groove 10 requires that one wall of the groove be removable. For that reason upper wall forming element 11 is detachably clamped in place by clamp nut 14.

An alternative assembly comprises a socket having the snap action device receiving groove molded therein and the socket being molded in two cooperative joinable halves which are secured together after insertion of the snap ring.

I show my device applied to an electrical plug and panel type socket arrangement in Fig. 6. The plug which may be a cable termination or a lamp base is provided with contacts 22 on the lower surface thereof. The socket is provided with inwardly extending preferably resilient contacting members 23. It is apparent that the axial pressure exerted by the snap action gripping device insures good electrical circuit continuity at the contacts. In the case of a polarized plug and socket I provide a keyway 23 in the plug for engagement with an extension 24 on socket 2.

Having thus described my invention, what I claim is:

1. A snap action gripping device comprising, a strip of resilient material substantially circumscribing a closed geometric figure, and so disposed that a plane passing through all points of the outer periphery is laterally disposed a distance less than the width of said strip to a plane passing through all points of the inner periphery; finger portions affixed to the strip and uniformly spaced from the inner periphery of said closed figure, and portions of the closed figure extending inwardly of the finger portions in a plane substantially that of the portions of the closed figure from which they respectively extend, each finger being normal to its respective portion of the geometric figure, and inwardly directed prongs integral with the free end of said fingers and substantially normal thereto respectively.

2. A snap action gripping device having a base of resilient material in the form of a strip so disposed as to at least partially enclose an area, said base being at all points inclined to a plane passing through all points of the outer periphery thereof, inwardly directed projections on the inner periphery of said base and co-planar therewith; finger portions affixed to said base, each finger portion being substantially normal to its contiguous base portion and prongs integral with said fingers and substantially normal to the face thereof which are directed toward said partially enclosed area.

3. A snap action gripping element comprising a base portion, base extension portions, finger portions and prong portions, said base portion being a strip of resilient material enclosing an area, and being at all points substantially equally inclined to a plane passing through the median line of said strip, said base extension portions being inwardly directed extensions affixed to the base portion and co-planar substantially therewith, said finger portions being portions affixed substantially normally to the respective base portions between the said extension portions, and prong portions inwardly struck on the free end of said fingers.

4. A snap action gripping device having two conditions of stability and having a base, base extensions, upwardly struck portions and inwardly struck portions, said base comprising an endless strip of resilient metal defining a frusto-polygon, said strip in one condition of stability defining an upwardly converging frusto-polygon and in the second condition of stability defining a downwardly converging frusto-polygon, said base extension having inwardly directed projections integral with and co-planar with spaced portions of the base; said upwardly struck portions having root portions integral with the base portion between the said inwardly directed extensions, and said inwardly struck portions having root portions integral with the free end of the finger portions.

5. A snap action clamping device, having a base, and finger portions having gripping portions, said base being a continuous strip of resilient metal and having the shape of the surface of a frusto-section of a right pyramid including a cone, said finger portions having root portions rigidly attached to spaced portions of the smaller peripheral edge of said base strip, and extending at a substantial angle thereto, said gripping portions being inwardly directed integral portions on the free end of said finger portions, and co-planar projections inwardly directed and integral with the smaller peripheral edge of said base strip between the finger root portions.

6. A snap action clamping device comprising a dished base having an open center and inwardly projecting portions integral with the inner periphery thereof and co-planar therewith, struck up finger portions on the inner periphery of said base between the inwardly projecting portions; and inwardly struck prongs on the free ends of said fingers.

7. In combination a plug and a socket, and a snap action gripping device, said socket having a wall defining a hollow space, and having a continuous groove in the inner surface thereof in a plane normal to the longitudinal axis thereof, said snap action gripping device having an open center continuous base portion, having an outer peripheral portion adapted to seat in said groove, fingers on the inner periphery of said base substantially normal thereto, inwardly directed prongs on the free ends thereof, outwardly extending protuberances on said fingers, and inwardly extending co-planar base portions, said plug having an extension portion adapted to pass through the space defined by the inwardly extending base portions, and terminating at a shoulder portion, said shoulder being adapted to pass through said prongs when open and to abut said inwardly extending base portions, a groove in said plug member spaced from said shoulder a distance equal substantially to the length of said fingers, whereby downward motion of said plug forces said inwardly extending base portions downward causing said fingers to move inwardly and said prongs to engage said groove.

8. The device of claim 7, including a hollow continuous shell, slidably supported by said plug and adapted to be positioned over said fingers when in engaged position.

9. The device of claim 8 wherein said fingers have outwardly projecting protrusions and said shell has an enlarged section intermediate the ends thereof, whereby said protuberances engage the interior surface of the enlarged section of shell to prevent the accidental removal thereof.

10. In combination a pair of coupling members, and a snap action gripping device, a first of said coupling members being hollow and having a groove in the inner surface thereof lying in a plane normal to the longitudinal axis thereof, said snap action gripping device having a continuous open center base portion having an external shape adapted to seat in said groove; fingers affixed to the inner periphery of the base portion and substantially normal thereto having inwardly directed prongs on the free ends thereof, said fingers having outwardly directed protrusions thereon; and the second of said coupling members adapted to telescope into the first coupling member having an elongated end portion, a peripheral collar forming the inner termination of the end portion and being of a length substantially equal to the length of the fingers, said base portion having a dished shape whereby a condition of stability is obtained when convex upward, and a second condition of stability is obtained when convex downward, whereby when said base portion is convex upward, said second coupling member collar portion is adapted to freely pass into the snap ring until the shoulder forming the lower termination thereof rests against the said base substantially co-planar projections, and under the influence of pressure exerted by the aforesaid shoulder, said snap ring is caused to snap from upward convex condition to a downward convex condition, whereby said inwardly directed prongs are caused to spring inwardly over the upper shoulder of the collar portion and axially toward the said first coupling member.

11. The device of claim 10 including a sleeve slidably supported on the external surface of said second coupling member and having an expanded portion intermediate the ends thereof and spaced from the lower end a distance not exceeding the distance between the base portion and finger protrusions whereby the same is adapted to be telescoped over the said fingers when in gripping position and said expanded portion frictionally engages said protrusions on said fingers to lock the same against opening.

FOSTER J. TRAINOR.

REFERENCES CITED

The following references are of record in the file of this patent:

UNITED STATES PATENTS

| Number | Name | Date |
| --- | --- | --- |
| 1,192,404 | Ewart | July 25, 1916 |
| 1,390,266 | Armstrong | Sept. 13, 1921 |